United States Patent [19]

Engbert et al.

[11] Patent Number: 4,929,724

[45] Date of Patent: May 29, 1990

[54] PROCESS FOR THE PRODUCTION OF URETDIONE GROUP-CONTAINING COMPOUNDS, THE COMPOUNDS OBTAINED ACCORDING TO THIS PROCESS AND THE USE THEREOF IN THE PRODUCTION OF POLYURETHANE PLASTICS MATERIAL

[75] Inventors: Theodor Engbert, Dormagen; Jürg Fröhlich, Burscheid; Werner Kubitza, Leverkusen, all of Fed. Rep. of Germany; Peter Breidenbach, Baytown, Tex.; Gerhard Mennicken, Leverkusen, Fed. Rep. of Germany

[73] Assignee: Bayer Aktiengesellschaft, Bayerwerk, Fed. Rep. of Germany

[21] Appl. No.: 783,704

[22] Filed: Oct. 3, 1985

[30] Foreign Application Priority Data

Oct. 13, 1984 [DE] Fed. Rep. of Germany ....... 3437635

[51] Int. Cl.$^5$ .......................................... C07D 229/00
[52] U.S. Cl. .................................................. 540/202
[58] Field of Search ......................................... 540/202

[56] References Cited

U.S. PATENT DOCUMENTS

| 3,290,288 | 12/1966 | Oertel et al. | 260/239 |
| 3,579,500 | 5/1971 | Jelinek | 540/202 |
| 4,336,365 | 6/1982 | Reischl et al. | 528/44 |
| 4,476,054 | 10/1984 | Disteldorf et al. | 260/239 |

FOREIGN PATENT DOCUMENTS

| 0166172 | 1/1986 | European Pat. Off. |
| 3227779 | 1/1984 | Fed. Rep. of Germany |
| 907014 | 2/1982 | U.S.S.R. |
| 1153815 | 5/1969 | United Kingdom |

OTHER PUBLICATIONS

Saunders and Frisch, "Polyurethanes—Chemistry and Technology", Part I, 1961, p. 61.
M. I. Bakhitov et al. (Vysokomol. Soedin) Series B 1981, 23 (9), pp. 680–682.
M. I. Bakhitov et al. (Vysokomol Soedin), Series B (1983) 25 (11), pp. 830–833.

*Primary Examiner*—Mukund J. Shah
*Assistant Examiner*—Carol L. Cseh
*Attorney, Agent, or Firm*—Joseph C. Gil; Thomas W. Roy

[57] ABSTRACT

The invention is directed to a process for the production of uretdione group-containing compounds by dimerizing at least a part of the isocyanate groups of organic isocyanates in the presence of compounds containing phosphorus-nitrogen bonds as dimerization catalysts, characterized in that the reaction is carried out in the presence, as co-catalysts, of H-active organic compounds having a pKa-value of at least 6, which have at least one hydrogen atom bound to oxygen, sulphur or nitrogen.

The invention also relates to the uretdione group-containing compounds obtained according to this process and to their use for the production of plastics materials according to the isocyanate-polyaddition process.

15 Claims, No Drawings

PROCESS FOR THE PRODUCTION OF URETDIONE GROUP-CONTAINING COMPOUNDS, THE COMPOUNDS OBTAINED ACCORDING TO THIS PROCESS AND THE USE THEREOF IN THE PRODUCTION OF POLYURETHANE PLASTICS MATERIAL

BACKGROUND OF THE INVENTION

1. Field of the Invention

This invention relates to an improved process for the production of uretdione group-containing compounds by dimerizing at least a part of the isocyanate groups of organic isocyanates, particularly of organic polyisocyanates with aliphatically-bound isocyanate groups, using new dimerization catalysts, which have both a catalyst component as well as a co-catalyst component, the uretdione group-containing compounds obtained according to this process and the use of the uretdione group-containing compounds based on organic polyisocyanates, obtained according to this process, in the production of polyurethane plastics materials.

2. Description of the Prior Art

While various processes are known for dimerizing aromatic isocyanates (see e.g. Saunders and Frisch, "Polyurethanes-Chemistry and Technology", Part I, 1962, p. 61 ff.), suitable processes for dimerizing isocyanates with aliphatically-bound isocyanate groups have so far hardly been described.

The longest-known process, according to which uretdione group-containing products are obtained starting from aliphatic isocyanates, is described in DE-OS No. 1,670,720. In this process trialkylphosphines in relatively high concentrations of up to 2% by weight are used as dimerization catalysts. Pure uretdiones are not produced, but rather mixtures of uretdiones and isocyanurates.

A recently-known process for the production of a practically isocyanurate-free isocyanatouretdione based on aliphatic isocyanate is shown by the process described in DE-AS No. 3,030,513 for dimerizing 3-isocyanatomethyl-3,5,5-trimethyl-cyclohexylisocyanate (isophorone diisocyanate). In this process, the amides of the phosphoric acids (aminophosphines), already described in U.S. Pat. No. 3,290,288 as dimerization catalysts for aromatic isocyanates, are used as dimerization catalysts. The isocyanato-uretdiones based on isophorone diisocyanate obtained in this manner are indeed practically free of isocyanurates, but the disadvantage in this process is that relatively high catalyst quantities are necessary for a sufficiently fast reaction; for example 2% by weight of tris-(dimethylamino)-phosphine are required in order to achieve an NCO-conversion of from 15 to 20% within from 10 to 30 hours.

This circumstance not only reduces the economy of the process due to the high catalyst concentration and the long reaction time, but the quality of the reaction products is also influenced in a disadvantageous manner.

A substantial disadvantage of the dimerization process described in DE-AS No. 3,030,513 is, moreover, the restricted use of this process.

Thus, for example, the attempt to react 2-methyl-1,5-diisocyanatopentane to produce practically isocyanurate-free products fails. As shown in DE-OS No. 3,227,779, the 2-methyl-1,5-diisocyanatopentane (predominantly in admixture with up to 12% by weight of 2-ethyl-1,4-diisocyanatobutane) can be dimerized in the presence of tris-(dimethylamino)-phosphine even under very mild conditions, but notable quantities of isocyanurates are also produced.

Furthermore, the process used in DE-OS No. 3,030,513 for the selective dimerization of isophoronediisocyanate also fails in the attempt to dimerize in a practically isocyanurate-free manner 1,6-diisocyanatohexane, which is of great technical importance. Products with a more or less high isocyanurate content are always obtained. This is described, for example, by M. I. Bakhitov et al (Vysokomol. Soedin., Ser. B (1981), 23 (9), pp. 680–682: see also Chemical Abstracts 96: 20 504 c) in which 1,6-diisocyanatohexane is reacted in the presence of tris-(diethylamino)-phosphine to produce isocyanurate group- and uretdione group-containing oligomers (see also SU-PS 907014, Chemical Abstracts 97: 24 371 a). As is moreover described by M. I. Bakhitov et al (Vysokomol Soedin., Ser. B (1983), 25 (11), pp. 830–833; see also Chemical Abstracts 100: 86 171 z), n-butylisocyanate and phenylisocyanate are also reacted during treatment with tris-(diethylamino)-phosphine to produce reaction products, which always contain troublesome quantities of isocyanurates.

The presence of isocyanurate groups is undesirable for a number of uses of dimeric isocyanates since isocyanurate group-containing uretdiones or isocyanatouretdiones are not completely reconvertible to the starting isocyanates. This impairs their use, for example, in uses requiring reactivation of isocyanate groups. Isocyanurate group-containing isocyanatouretdiones moreover have a relatively high viscosity, due to their branched structure, which substantially reduces their usefulness, particularly in polyurethane lacquers with a low solvent content.

It was thus an object of the invention to produce a new process for dimerizing organic isocyanates, which allows organic isocyanates to be dimerized with high selectivity, and which produces dimerization products of high quality, particularly regarding color.

This object could surprisingly be achieved by using the catalyst combinations described in more detail below as dimerization catalysts.

SUMMARY OF THE INVENTION

The invention is directed to a process for the production of uretdione group-containing compounds by dimerizing at least a part of the isocyanate groups of organic isocyanates in the presence of compounds containing phosphorus-nitrogen bonds as dimerization catalysts, characterized in that the reaction is carried out in the presence, as co-catalysts, of H-active organic compounds having a pKs-value of at least 6, which have at least one hydrogen atom bound to oxygen, sulphur or nitrogen.

The invention also relates to uretdione groupcontaining compounds obtained according to this process.

The invention finally also relates to the use of uretdione group-containing compounds, obtained according to the process of the invention, based on organic polyisocyanates as starting material in the production of polyurethane plastics materials according to the isocyanate-polyaddition process.

DETAILED DESCRIPTION OF THE INVENTION

An important characteristic of the invention is that combinations of particular catalysts of the prior art with particular co-catalysts are used as dimerization catalysts, in order thereby to improve the effectiveness and selectivity of the known catalysts.

As catalysts there can be used any compounds having at least one phosphorus-nitrogen bond which have already been recommended as dimerization catalysts (c.f. e.g. U.S. Pat. No. 3,290,288). Suitable compounds having phosphorus-nitrogen bonds are, for example, those of the general formula (I)

$$X_mP(NR_2)_{3-m} \quad (I)$$

wherein
X represents —Cl, —OR or —R,
R represents the same or different, optionally olefinically unsaturated alkyl, aryl, aralkyl or cycloalkyl radicals, wherein both radicals bonded to the nitrogen atom can form together with the nitrogen atom, a heterocyclic ring optionally having further hetero atoms, and the radicals R which are not bonded to the nitrogen atom (when X=—OR or —R) can optionally have chlorine substituents, and
m represents 0, 1 or 2.
The corresponding derivatives of phosphorous acid (X=—OR, m=0,1 or 2) and the corresponding derivatives of phosphonous acids (X=—R, m=1) are in particular among the preferred catalysts.

The most preferred catalysts are compounds of the general formula (I) in which
m represents 0 and
R represents the same or different alkyl radicals having in each case from 1 to 4 carbon atoms, or the two radicals bonded to the nitrogen atom form together with the nitrogen atom, a 3- to 6-membered, saturated heterocyclic ring, which can optionally have an oxygen bridge as ring member, and are otherwise present in the methylene groups as further ring members.

Examples of such compounds suitable as catalysts according to the invention are the named compounds corresponding to these definitions in U.S. Pat. No. 3,290,288, herein incorporated by reference. Tris-(dimethylamino)-phosphine (N,N,N',N',N'',N''-hexamethylphosphoric acid triamide) and tris-(diethylamino)phosphine (N,N,N',N',N'',N''-hexaethyl-phosphoric acid triamide) are the most particularly preferred catalysts to be used.

In carrying out the process according to the invention, the catalysts named as examples are generally used in a quantity of about 0.01 to 5% by weight, preferably about 0.1 to 1% by weight, based on the quantity of the starting isocyanate used.

In the case of the co-catalysts used according to the invention, any organic compounds may be used, which have at least one hydrogen atom bonded to oxygen, sulphur or nitrogen and a pKs-value of at least 6. Compounds of the classes of alcohols, phenols, primary and secondary amines, urethanes, ureas, amides, and allophanates, biurets and oximes and the reaction products optionally arising by the addition reaction of such compounds with part of the starting isocyanate, are among the preferred co-catalysts.

Particularly preferred for use as co-catalysts according to the invention are alcohols, primary or secondary amines or carboxylic acid amides which have the desired co-catalytic effect, both as such and in the form of the addition products thereof with the starting isocyanates used in each case (particularly in the form of the corresponding urethanes or ureas). Aliphatic or cycloaliphatic compounds which have a molecular weight of 32 to about 400 and at least one alcoholic hydroxyl group are particularly preferred as co-catalysts.

The co-catalysts used according to the invention can contain one or several functional groups associated with the named compound classes, as well as different functional groups next to each other. Mixtures of different co-catalysts can also be used.

The co-catalysts used according to the invention preferably have from 1 to 3 identical or different functional groups of this kind.

Examples of suitable, particularly preferred alcohols with a molecular weight of 32 to 400, which have at least one alcoholic hydroxyl group and in addition can have optional further functional groups of the kind referred to above include methanol, ethanol, propanol, 2-ethylhexanol, 2-ethoxyethanol, diethylene glycol monomethyl ether, cyclohexanol, benzyl alcohol, β-phenylethanol, ethylene glycol, 1,3-butane-diol, 1,2-propane-diol, 1,6-hexane-diol, 2,2-dimethyl-1,3-propane-diol, di- and polyethylene glycols of the aforementioned molecular weight range, di- and polypropylene glycols of the aforementioned molecular weight range, 1,3-cyclohexane-diol, 1,4-bis-(hydroxymethyl)-benzene, glycerol, 1,2,6-hexane-triol, N-methylethanolamine, diethanolamine, adipic acid-bis(hydroxyethyl)-ester, 2-hydroxyacetic acid-N-ethyl-amide or N-(2-hydroxy-propyl)-morpholine. The monohydric or polyhydric alcohols named as examples, which have no further functional groups, are most preferably used.

Suitable co-catalysts of the phenol group include phenol, the isomeric cresols, 3-ethyl-5-methylphenol, 4-nonylphenol or dodecylphenol.

Suitable co-catalysts of the amine class of compounds include n-butylamine, n-hexylamine, 2-ethylhexylamine, n-dodecylamine, allylamine, 3-ethoxypropylamine, diisopropylamine, dibutylamine, bis-(2-ethyl-hexyl)-amine, 1,4-bis-(3-aminopropoxy)-butane, N-ethylcyclohexylamine, N-butylaniline, 2,5-diamino-2,5dimethylhexane, and cyclic amines such as piperidine or pyrrolidine.

Suitable co-catalysts from the urethane class of compounds are, for example, ethoxycarbonylaminoethane, ethoxycarbonylaminohexane, methoxycarbonylaminocyclohexane, butoxycarbonylaminobenzene, 1,6-bis-(ethoxycarbonylamino)-hexane, 1-(ethoxycarbonylamino)3,5,5-trimethyl-5-(ethoxycarbonylaminomethyl)-cyclohexane, 4,4'-bis-(ethoxycarbonylamino)-dicyclohexylmethane, 1-methyl-2,4-bis-(ethoxycarbonylamino)-benzene and other urethanes obtained from organic isocyanates and alcohols. In addition, compounds such as carbamic acid-O-ethylesters, carbamic acid-O-hexylesters and 1,6-hexanediol-bis-O,O-carbamic acid esters and also urethane group-containing cyclic compounds such as oxazolidinone and methyloxazolidinone may be used.

Suitable co-catalysts of the urea class of compounds include urea, N-methyl urea, N-cyclohexyl urea, N-phenyl urea, N,N-dimethyl urea, N,N'-substituted ureas produced from amines and organic isocyanates such as N,N'-dimethyl urea, N-methyl-N'-hexyl urea, N-ethyl-N'-phenyl urea, N-butyl-N'-dodecyl urea, 1,6-hexamethylene-bis-(3-ethylurea), 1,6-hexamethylenebis(3,3-dibutylurea) and urea group-containing cyclic compounds such as N,N'-ethylene urea and N-methyl-N,N'ethylene urea.

Suitable co-catalysts of the amide class of compounds include formamide, acetamide, N-methylacetamide, 2-ethyl caproic acid amide, N-ethyl caproic acid amide, N-butylbenzoic acid amide, and cyclic amides such as 2-pyrrolidinone and c-caprolactam.

Suitable co-catalysts of the allophanate class of compounds include allophanic acid-O-ethyl esters as well as allophanate group-containing compounds, as obtained in an addition reaction from inter alia the urethane group-containing compounds and organic isocyanates named as examples.

Suitable co-catalysts of the biuret group of compounds include unsubstituted biuret, 1,5-dibutylbiuret, 1,5-diphenylbiuret, 1-phenyl-5-ethylbiuret as well as biuret group-containing compounds obtained in an addition reaction inter alia from the urea group-containing compounds and organic isocyanates named as examples.

Suitable co-catalysts of the oxime class of compounds include acetoxime, acetone-oxime, 2-butanoneoxime and methylisobutylketone-oxime.

Further compounds suitable as co-catalysts according to the invention include p-aminophenol, N-phenylacetamide, morpholine, N-aminomorpholine, or tris-(isocyanatohexyl)-biuret or the mixtures thereof with relatively high homologs thereof. Such biurets are formed, for example, by reacting 1,6-diisocyanatohexane with water at elevated temperature via the intermediate stage of the corresponding ureas. According to this, it is in principle also possible to use water as a potential co-catalyst in the process according to the invention, since this reacts in situ with the starting isocyanate to form ureas or biurets, which themselves are effective as co-catalysts. The use of water in place of the co-catalysts named as examples is, however, less preferable, since, as mentioned above the derivative formed by an addition reaction only acquires a co-catalytic effect, while the co-catalysts named as examples already have the desired co-catalytic effect themselves.

The co-catalytic effect of the co-catalysts named as examples is naturally also dependent on the concentration of the functional groups in the co-catalysts. Thus, comparatively high molecular weight compounds which have only a very small concentration of such groups are less preferably used.

In the process according to the invention, the co-catalysts are generally used in a quantity of about 0.1 to 5% by weight, preferably about 0.2 to 1% by weight, based on the quantity of the starting isocyanate used. The optimum quantity of co-catalyst for the desired complete reaction course without formation of isocyanurates is dependent on the type and quantity of the phosphorus nitrogen bond-containing catalysts as well as on the type of isocyanate to be dimerized, and can be easily determined by appropriate preliminary testing.

Starting materials for the process according to the invention are any organic mono- and polyisocyanates, such as aliphatic, cycloaliphatic, araliphatic and/or aromatic isocyanates, as described, for example, in Houben-Weyl, Methoden der Organischen Chemie, Volume 14/2, pp. 61–70 or by W. Siefken in Annalen der Chemie 562, pp. 75–136.

Suitable monoisocyanates include those in the molecular weight range of 57 to 400 such as methyl isocyanate, ethyl isocyanate, n-butyl isocyanate, dodecyl isocyanate, stearyl isocyanate, cyclohexyl isocyanate, 2-chloroethyl isocyanate, 6-chlorohexyl isocyanate, benzyl isocyanate, β-phenylethyl isocyanate, phenyl isocyanate or 3-chlorophenyl isocyanate.

Suitable diisocyanates include those in the molecular weight range of 140 to 400 such as 1,4-diisocyanatobutane, 1,6-diisocyanatohexane, 1,5-diisocyanato-2,2-dimethylpentane, 2,2,4- or 2,4,4-trimethyl-1,6-diisocyanatohexane, 1,10-diisocyanatodecane, 1,3-and 1,4-diisocyanato-cyclohexane, isophorone-diisocyanate, 1,3- and 1,4-xylylene-diisocyanate, 4,4'-diisocyanato-dicyclohexylmethane, 4-(4'-methyl-3'-isocyanatobenzyl)-cyclohexylisocyanate, 2,4- and 2,6-diisocyanatotoluene, 2,4'- and 4,4'-diisocyanatodiphenylmethane, or 1,5-diisocyanatonaphthalene.

Suitable higher functional polyisocyanates include those with a molecular weight of up to 1000 such as 1,6,11-triisocyanatoundecane, 1,5-diisocyanatocaproic acid-(2-isocyanatoethyl)-ester, 4,4',4''-triisocyanato-triphenylmethane, tris-(4-isocyanatophenyl)thiophosphate or higher functional polyisocyanates of the diphenylmethane series which are generally present in admixture with the corresponding diisocyanates of the type already mentioned above as an example.

In the process according to the invention, any mixtures of the mono- and polyfunctional isocyanates named as examples can be used. Polyisocyanates of the type exemplified are preferably used as starting materials in the process according to the invention, particularly diisocyanates with aliphatically bound isocyanate groups.

1,6-Diisocyanatohexane is most preferably used as a starting material according to the invention.

The process according to the invention generally takes place without the concurrent use of solvents, although the use of solvents is not excluded. Suitable solvents are those which are inert in relation to isocyanate groups and have a weak to average polarity such as hexane, toluene, xylene, chlorobenzene, acetic acid ethyl ester, acetic acid butyl ester, ethyl glycol acetate, propylene glycol-monomethyl-ether acetate, acetone, methylisobutyl ketone, methylene chloride, N-methylpyrrolidone or any mixtures of such solvents.

The process according to the invention can in principle be carried out according to two different embodiments. According to a first embodiment of the process according to the invention, all isocyanate groups present in the starting isocyanate are dimerized to produce uretdione groups. According to a second embodiment of the process according to the invention, the dimerization reaction is terminated by addition of a catalyst poison at a degree of dimerization of less than 100%, preferably about 10 to 50%.

The first embodiment is preferably used in the dimerization of monoisocyanates or of isocyanate mixtures with an average NCO-functionality of less than two. The second embodiment is generally used with difunctional or higher functional polyisocyanates, so that isocyanate group-containing uretdiones are formed as process products, which can optionally be separated from unreacted, excess starting isocyanates by distillation. This removal by distillation of unreacted starting diisocyanates may take place, for example, in thin-layer distillation apparatus wherein the distillation conditions should be as mild as possible in order to avoid cleavage of the uretdione groups. In those cases where the uretdione group-containing process products have a clearly lower solubility in the optionally solvent-containing reaction mixture than the starting isocyanates, the separation of the starting material can also take place by crystallization and subsequent filtration. Extractive processes can also be used for separating excess starting isocyanate. The process according to the invention is generally carried out at a temperature of about 0° to 100° C., preferably about 10° to 60° C. Temperatures of greater than 100° C. should be avoided, if possible, in order to prevent the formation of undesirable isocyanurates.

A particular advantage of the process according to the invention can be seen in that it allows a very safe and selective conversion of organic isocyanates to uretdiones or isocyanato-uretdiones up to a relatively high temperature of, for example, 60° C. Even in those cases in which, according to state-of-the-art processes known until now, a practically isocyanurate-free dimerization is not at all possible or only at a temperature of less than 40° C., uretdiones are practically exclusively formed according to the process of the invention up to a temperature of 60° C. The good reproducibility of the process according to the invention is, moreover, to be emphasized, even in the aforementioned critical cases, in which the previously known processes have failed.

The possibility of being able to carry out the process according to the invention at a relatively high temperature is linked on a technical scale with a relatively high production safety during the process and has the advantage, moreover, that higher reaction rates and thus higher space-time yields can be produced than has been possible until now. Starting from an aliphatic isocyanate such as 2-methylpentane-1,5-diisocyanate, the reaction time normally required for a 20% NCO-conversion is about 1 hour when tris-(dimethylamino)-phosphine is used as catalyst and alcohols are used as co-catalyst in each case in a quantity of 1% by weight.

Compared with the alternative process described in DE-OS No. 3,227,779, in which 2-methyl-pentane-diisocyanate is reacted at room temperature in the absence of the co-catalysts according to the invention and taking into account a high uretdione yield, this represents an increase in the space-time yield of from 2 to 3 times.

The catalysis according to the invention entails the joint use of the specified co-catalytically active compounds, results in a reaction which is even and, as mentioned, selective to a high degree, in the preferably used temperature range of about 10° to 60° C., the reacted isocyanate groups being converted into uretdione groups with a selectivity of normally more than 90%, preferably more than 95%. Since practically no isocyanurate groups are formed during the reaction, the reaction is hardly exothermic and is readily controllable at any time.

Furthermore, the concurrent use of co-catalysts, as required by the invention, has a favorable influence on the color quality of the reaction products. Under the same conditions, reactions carried out in the absence of the co-catalytically active compounds always result in substantially darker colored products.

As already mentioned, the process according to the invention is carried out using at least difunctional isocyanates preferably according to the second embodiment wherein the reaction is terminated at a degree of dimerization of preferably about 10 to 50%, by the addition of a catalyst poison. The term "degree of dimerization" is here to be understood as the percentage of isocyanate groups in the starting isocyanate which are converted into uretdione groups. Suitable catalyst poisons include strongly acidic compounds such as chloroacetic acid, trichloroacetic acid, trifluoroacetic acid, methane-sulphonic acid, perfluorobutane-sulphonic acid, phosphoric acid, acidic phosphoric acid esters, gaseous hydrochloric acids and compounds which can be easily split to form these acids, for example carbamic acid chlorides. Other suitable deactivators include tosyl isocyanate, sulphur and alkylating-active compounds such as methyl iodide and toluene-sulphonic acid methyl ester. Acid anhydrides such as acetic anhydride, succinic anhydride inter alia, are also useful as deactivators.

Generally, all compounds are suitable as deactivators which are also suitable for terminating the reaction according to the known process of the prior art wherein only the phosphorus-nitrogen bond-containing catalysts are used. Such deactivators are mentioned, for example, in DE-OS No. 1,670,720 and DE-OS No. 1,934,763.

The deactivation of catalysts, as described in DE-OS No. 3,030,513, can be dispensed with, for example, when the reaction mixture is immediately worked up by distillation after reaching the desired degree of conversion and conditions are thereby selected, under which the catalyst is distilled off together with the excess starting isocyanate. This procedure suffers from the disadvantage, however, that further reactions may occur in an uncontrollable manner during and after working up, for example further dimerizations, trimerizations and/or conversions of uretdiones to isocyanurates.

The products obtained according to the process of the invention, optionally freed from the excess starting isocyanate, give partly solid, partly liquid products at room temperature. While aromatic isocyanates such as 4-isocyanatotoluene, 2,4-diisocyanatotoluene or 4,4'-diisocyanatodiphenylmethane generally give solid dimerization products, both solid and liquid products are obtained from aliphatic isocyanates.

In the latter case, the products obtained by the process according to the invention are partly characterized by an extraordinarily low viscosity. For example, products which are obtained starting from 1,6-diisocyanatohexane after the distillative separation of excess starting isocyanate with an NCO content of from 20 to 22% by weight, have a viscosity of less than 100 mPas (25° C.).

The products obtained by the process according to the invention and optionally freed from excess starting isocyanate represent valuable intermediate products for the production of other, particularly high-molecular weight materials, for example, by reaction with compounds having isocyanate-reactive groups to produce polyisocyanate polyaddition products.

Thus the isocyanatouretdiones produced from polyfunctional aromatic isocyanates as described, for example, in DE-PS No. 968,566, can be processed with hydroxy- and/or amine group-containing reactants, for example polyhydroxy polyurethanes, to produce heat-setting plastics material compositions. The uretdione groups capable of being split by heating in this case contribute substantially to the setting of such plastics material compositions.

Isocyanatouretdiones based on polyfunctional aliphatic isocyanates are exceedingly suitable, after the separation of the excess monomeric starting isocyanate, for the production of light-fast one- and two-component polyurethane lacquers. This also applies to the particularly preferred process product according to the invention based on 1,6-diisocyanatohexane. This can be advantageously used, for example, as a reactive diluent for other relatively highly viscous or solid NCO-group-containing lacquer components or as a polyisocyanate component in solvent-free or low-solvent polyurethane lacquer systems.

Uretdiones according to the invention, based on monofunctional starting isocyanates, represent potential monoisocyanates and can be used, for example, as intermediate products for the production of plant protection agents. The dimeric monoisocyanates produced according to the invention have the advantage of a substantially low vapor pressure compared with the monomeric isocyanates on which they are based.

The following examples explain the invention in more detail. All percentage data relates to % by weight, unless otherwise indicated.

EXAMPLES

Example 1

400 g of 1,6-diisocyanatohexane were added with the exclusion of air to a 500 ml multi-necked flask heated to 60° C. and reacted with thorough stirring, first with 4 g of tetraethylene-glycol and then with 4 g of tris-(dimethylamino)-phosphine.

The spontaneous reaction was barely exothermic, with the result that water cooling was not necessary. After a total of 1.5 h of stirring at 60° C., the NCO-content of the reaction mixture had fallen to 41.5%, and further reaction was then stopped by the addition of 1.88 g of trifluoroacetic acid.

The reaction product obtained was absolutely clear and practically colorless: the NCO-content thereof was 41.3%. By means of an IR-spectroscopic examination of the reaction product, a molar ratio of uretdione groups to isocyanurate groups of 97:3 was determined.

Comparative Example 1a

The procedure was as in Example 1, but with the difference that no tetraethylene-glycol was used.

The spontaneous reaction after the addition of catalyst was clearly more exothermic than in Example 1, and the reaction time before reaching an NCO-content of 41.5% was 50 min.

After terminating the reaction with 1.88 g of trifluoroacetic acid, the reaction product had an NCO-content of 41.2%, was absolutely clear and from light to medium yellow in color; the IR-spectroscopically determined molar ratio of uretdione groups to isocyanurate groups was about 64:36.

Example 2

The procedure was as in Example 1, except that the reaction was carried out at a temperature of 40° C.

After a reaction time of 4.5 h and at an NCO-content of 35%, further reaction was terminated by the addition of 1.88 g of trifluoroacetic acid.

The reaction product obtained was absolutely clear and practically colorless; the IR-spectroscopic examination showed no isocyanurate groups (molar ratio of uretdione groups to isocyanurate groups >2299:1).

Comparative Example 2a

The procedure was as in Example 2, but no tetraethylene-glycol was used.

After a total reaction time of 4.75 h and when the NCO-content of the reaction mixture had fallen to 34%, further reaction was stopped by the addition of 1.88 g of trifluoroacetic acid.

The resulting clear reaction product was a clear yellow in color and the IR-spectrum showed notable quantities of isocyanurate groups (molar ratio of uretdione groups to isocyanurate groups =81:19).

Examples 3 to 20

In Examples 3 to 20, the procedure was as described in Example 2. In place of tetraethyleneglycol, however, other co-catalytically active additives were used.

The type and quantity of these additives, as well as the other data determined for the course of reaction and the reaction products in each case, can be seen in the following Table 1.

TABLE 1

| Example | Co-catalyst used | Quantity of co-catalyst % based on mixture (a) | Duration of reaction in h. | NCO-content of the terminated product | Color of the terminated product | Molar ratio of uretdione to isocyanurate (b) |
| --- | --- | --- | --- | --- | --- | --- |
| 3 | ethanol | 1.0 | 2.0 | 40.3% | >almost colorless | 99:1 |
| 4 | neopentyl glycol | 1.0 | 1.5 | 41.2% | >almost colorless | 99:1 |
| 5 | 1,3-butane-diol | 1.0 | 1.5 | 40.7% | >almost colorless | 99:1 |
| 6 | phenyl-NHCO$_2$Et | 2.5 | 1.75 | 41.0% | light yellow | 98:2 |
| 7 | N-methyldiethanol-amine | 1.0 | 1.75 | 39.7% | >light yellow | 99:1 |
| 8 | phenol | 1.0 | 1.75 | 39.3% | almost yellow | 96:4 |
| 9 | N,N'-dimethylurea | 1.0 | 1.0 | 42.2% | light yellow | 95:5 |
| 10 | Desmodur N (c) | 1.0 | 2.0 | 40.1% | light yellow | 97:3 |
| 11 | N-methylethanolamine | 1.0 | 2.0 | 40.0% | >almost colorless | 99:1 |
| 12 | ε-caprolactam | 1.0 | 2.5 | 39.8% | >light yellow | 99:1 |
| 13 | 2-butanone-oxime | 1.0 | 2.1 | 39.7% | medium yellow | 98:2 |
| 14 | trichloroethanol | 1.0 | 2.5 | 40.0% | deep yellow | 97:3 |
| 15 | diethylamine | 1.0 | 2.5 | 38.5% | light yellow | 98:2 |
| 16 | glycerol | 1.0 | 2.2 | 39.5% | >almost colorless | 99:1 |
| 17 | toluidine | 1.0 | 1.5 | 39.6% | >orange-yellow | 99:1 |
| 18 | dodecylamine | 1.0 | 2.0 | 40.1% | light yellow | 95:5 |
| 19 | carbamic acid-O-ethylester | 1.0 | 5.0 | 42.5% | medium yellow | 97:3 |
| 20 | t-butanol | 1.0 | 2.5 | 39.7% | >light yellow | 99:1 |

(a) based on the quanitity of isocyanate used
(b) IR-spectroscopically determined
(c) commercial product of BAYER AG: isocyanatobiuret based on 1,6-diisocyanatohexane, solvent-free

Example 21

400 g of 1,6-diisocyanatohexane were added with the exclusion of air to a 500 ml multi-necked flask, heated to 40° C. and, with intensive stirring, first reacted with 4 g of 1,3-butane-diol and then with 6 g of tris-(diethylamino)-phosphine.

In the course of the next 2.5 h, in which the reaction mixture was stirred at a temperature of 40° C., the NCO-content of the reaction mixture fell with a hardly noticeable heat of reaction to a value of 42.3%. On reaching this value, further reaction was stopped by the addition of 5.2 g of 2-ethyl-caproic acid. The resulting clear reaction product was slightly yellow in color (iodine color value: 1–2) and, according to IR-spectroscopic examination, had no isocyanurate groups.

Comparative Example 21a

The procedure was as in Example 21, except that no 1,3-butane-diol was used.

After a total reaction time of 5 h and when the NCO-content of the reaction mixture had fallen to a value of 43.7%, further reaction was stopped by the addition of 5.2 g of 2-ethyl-caproic acid. The reaction product thus obtained was absolutely clear and deep yellow in color (iodine value: 4–5); the molar ratio of uretdione groups to isocyanurate groups was 97:3 according to IR-spectroscopic examination.

Example 22

The procedure was as in Example 21, except that an equal amount of neopentylglycol was used in place of the 1,3-butane-diol and the reaction temperature was 60° C.

The reaction was terminated after a reaction time of 3.5 h on reaching an NCO-content of 42.7%. The reaction product was absolutely clear, from light to medium yellow in color and had, according to IR-spectroscopic examination, uretdione groups and isocyanurate groups in a molar ratio of 98:2.

Comparative Example 22a

The procedure was as in Example 22, except that no neopentylglycol was used.

The reaction was terminated after 3.5 h on reaching an NCO-content of 42.1%. The clear reaction product obtained was brown-yellow in color and had, according to IR-spectroscopic examination, uretdione groups and isocyanurate groups in a molar ratio of 94:6.

Example 23

5000 g of 1,6-diisocyanatohexane were added to a 6 l flask which had been flushed with nitrogen, heated to 40° C. and, with intensive stirring, first reacted with 50 g of tetraethylene glycol and then with 25 g of tris-(dimethylamino)-phosphine. Stirring took place for 3.5 h at a temperature of 40° C. until the NCO-content of the reaction mixture had fallen to 40%. Further reaction was prevented by the addition of 50 g of phosphoric acid di-(2-ethylhexyl)-ester and then by 30 min. subsequent stirring at 40° C.

The product thus obtained, which according to IR-spectroscopic examination had no isocyanurate groups, had an NCO-content of 39.6% and an iodine color value, determined according to DIN 6162, of clearly less than 1.

4840 g of this product were substantially separated from excess monomeric starting material in a conventional thin-layer evaporator under a pressure of from 0.1 to 0.2 mbars and at a cover temperature of 160° C. 3180 g of colorless distillate and 1630 g of a residue which was slightly yellow in color were obtained, the residue having the following analytical data:

| | |
|---|---|
| Viscosity at 25° C.: | 60 mPas |
| Iodine color value according to DIN 6162: | 1–2 |
| NCO-content: | 21.1% |
| Monomer content: | <1% |

Example 24

400 g of 3-isocyanatomethyl-3,5,5-trimethylcyclohexyl isocyanate were added, with the exclusion of air, to a 500 ml multi-necked flask, heated to 40° C. and, with intensive stirring, first reacted with 4.0 g of 1,3-butane-diol and then with 4.0 g of tris-(diethylamino)-phosphine.

When the NCO-content of the reaction mixture had fallen to a value of 33.5% after a total reaction time of 7 h, in which the reaction mixture was first stirred for 3 h at 40° C. and then for 4 h at 60° C., further reaction was stopped by the addition of 8.0 g of phosphoric acid di-(2-ethylhexyl)-ester. The reaction product obtained was absolutely clear and practically colorless (iodine color value according to DIN 6162: <1) and, according to IR-spectroscopic examination, had no isocyanurate groups. The NCO-content thereof was 33.5%.

Comparative Example 24a

The procedure was as in Example 24, but with the difference that no 1,3-butane-diol was used. The reaction product obtained after termination had an NCO-content of 33.7%, had no isocyanurate groups according to IR-spectroscopic examination, was absolutely clear, but was clearly more yellow in color than the product obtained in Example 24 according to the invention (iodine color value according to DIN 6162: 1–2).

Example 25

150 g of n-butylisocyanate were reacted at room temperature first with 1.5 g of 1,3-butane-diol and then with 3.0 g of tris-(dimethylamino)-phosphine. The reaction mixture was then heated to 40° C. and stirred for 7 h at the same temperature. In order to prevent further reaction, 6.0 g of phosphoric acid di-(2-ethylhexyl)-ester were added. The reaction mixture obtained, which is slightly yellow in color, has an NCO-content of 37.0% and, according to IR-spectroscopic examination, has no isocyanurate groups.

Comparative Example 25a

The procedure was as in Example 25, but with the difference that no 1,3-butane-diol was used. The reaction product obtained after termination was deep yellow in color, had an NCO-content of 37.5% and had, according to IR-spectroscopic examination, uretdione groups and isocyanurate groups in a molar ratio of 60:40.

Example 26

First 5.0 g of 2-ethylhexanol and then 0.5 g of tris-(dimethylamino)-phosphine were added at room temperature to a solution of 174 g of 2,4'-diisocyanatotoluene in 147 ml of n-hexane. After heating to 40° C., the reaction mixture was stirred for a further 30 min. and then reacted with 1.5 g of phosphoric acid di-(2ethyl-hexyl)-ester. A practically colorless crystal paste was obtained as product which, according to IR-spectroscopic examination, had no isocyanurate group-containing compounds.

Comparative Example 26a

The procedure was as in Example 26, but with the difference that no 2-ethylhexanol was used. The product obtained after termination, which had a consistency similar to that described in Example 26, had according to IR-spectroscopic examination no isocyanurate groups, but was strongly yellow in color.

Example 27

200 g of an isocyanate mixture consisting of 92% of 2-methyl-1,5-pentane-diisocyanate and 8% of 2-ethyl-1,4-butane-diisocyanate were added to a 500 ml flask with the exclusion of air, and reacted in turn with 2.0 g of 1,3-butane-diol and 1.0 g of tris (dimethylamino)-phosphine.

The reaction mixture was then heated to 40° C. and stirred for 1.5 h at this temperature until the NCO-content of the reaction mixture had fallen to 40.4%. 1.85 g of stearic acid chloride were added for termination and stirring was carried out for a further 2 h at 40° C.

The reaction product obtained had an NCO-content of 40.2% and was absolutely clear and medium yellow in color (iodine color value according to DIN 6162: 3-4). The ratio or uretdione groups to isocyanurate groups according to IR-spectroscopic examination was 96:4.

Comparative Example 27a

The procedure was as in Example 27, but with the difference that no 1,3-butane-diol was used. After a reaction time of 3.0 h, the NCO-content of the reaction mixture had fallen to a value of 40% and the reaction was stopped as described in Example 27.

The reaction product obtained had an NCO-content of 39.3%, was absolutely clear, but had a clearly darker color than that obtained in Example 27 (iodine color value according to DIN 6162: 7-8). The ratio of uretdione to isocyanurate groups according to IR-spectroscopic examination was 85:15.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of compounds having uretdione groups by dimerizing at least a portion of the isocyanate groups of organic isocyanates having aliphatically-bound isocyanate groups in the presence of catalysts having phosphorus-nitrogen bonds and, additionally, in the presence of co-catalysts which are H-active organic compounds with a pKs-value of at least 6, said H-active organic compounds having at least one hydrogen atom bonded to oxygen, sulphur or nitrogen.

2. The process of claim 1 wherein said co-catalysts are selected from the group consisting of alcohols, phenols, primary amines, secondary amines, amides, oximes, addition products of these compounds with organic isocyanate and mixtures thereof.

3. The process of claim 1 wherein said organic isocyanates are organic polyisocyanates.

4. The process of claim 1 wherein said organic isocyanates are diisocyanates with aliphatically-bound isocyanate groups.

5. The process of claim 1 wherein said organic isocyanates are 1,6-diisocyanatohexane.

6. The process of claim 3 which additionally comprises terminating the dimerization reaction at a degree of dimerization of about 10 to 50% by the addition of the catalyst poison and removing excess unreacted starting polyisocyanate from the reaction mixture by distillation.

7. The process of claim 1 wherein said catalysts are compounds corresponding to the formula $$P(NR_2)_3$$

wherein R represents the same or different aliphatic hydrocarbon radical having 1 to 4 carbon atoms or wherein two of the radicals R form, with the nitrogen atom, a heterocyclic ring having 3 to 6 ring members.

8. The process of claim 7 wherein said co-catalysts are mono- and/or polyhydric aliphatic or cycloaliphatic alcohols having up to 10 carbon atoms and/or urethanes formed from the reaction of said alcohols and a portion of said organic isocyanates.

9. The process of claim 1 wherein said reaction is carried out at a temperature of about 10° to 60° C.

10. The uretdione group-containing compounds obtained according to the process of claim 1.

11. A process for the production of polyisocyanate polyaddition products which comprises reacting the uretdione group-containing compounds of claim 10 with an isocyanate-reactive compound.

12. The process of claim 11 wherein said polyisocyanate polyaddition products are polyurethane plastics materials and said isocyanate-reactive compounds comprise compounds having hydroxyl groups.

13. The process of claim 4 wherein said catalysts are compounds corresponding to the formula $$P(NR_2)_3$$

wherein R represents the same or different aliphatic hydrocarbon radicals having 1 to 4 carbon atoms or wherein two of the radicals R form, when the nitrogen atom, a heterocyclic ring having 3 to 6 ring members.

14. The process of claim 13 wherein said co-catalysts are mono- and/or polyhydric aliphatic or cycloaliphatic alcohols having up to 10 carbon atoms and/or urethanes formed from the reaction of said alcohols and a portion of said organic isocyanates.

15. The uretdione group-containing compounds obtained according to the process of claim 4.

* * * * *